US012592442B2

(12) United States Patent
Hauenstein

(10) Patent No.: US 12,592,442 B2
(45) Date of Patent: Mar. 31, 2026

(54) EXTERIOR THERMAL BATTERY COVER

(71) Applicant: AUTONEUM MANAGEMENT AG, Winterthur (CH)

(72) Inventor: Michael Hauenstein, Maienriedweg (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 979 days.

(21) Appl. No.: 17/756,620

(22) PCT Filed: Dec. 3, 2020

(86) PCT No.: PCT/EP2020/084438
§ 371 (c)(1),
(2) Date: May 27, 2022

(87) PCT Pub. No.: WO2021/110821
PCT Pub. Date: Jun. 10, 2021

(65) Prior Publication Data
US 2022/0416356 A1 Dec. 29, 2022

(30) Foreign Application Priority Data

Dec. 6, 2019 (EP) .................................... 19214274

(51) Int. Cl.
| | |
|---|---|
| *H01M 50/28* | (2021.01) |
| *B60K 1/04* | (2019.01) |
| *H01M 10/613* | (2014.01) |
| *H01M 10/625* | (2014.01) |
| *H01M 10/658* | (2014.01) |
| *H01M 50/249* | (2021.01) |
| *H01M 50/278* | (2021.01) |
| *H01M 50/282* | (2021.01) |

(52) U.S. Cl.
CPC ............... *H01M 50/28* (2021.01); *B60K 1/04* (2013.01); *H01M 10/613* (2015.04);
(Continued)

(58) Field of Classification Search
CPC .. H01M 50/271; H01M 50/28; H01M 10/613; H01M 10/625; H01M 10/658; H01M 50/278
See application file for complete search history.

(56) References Cited

U.S. PATENT DOCUMENTS

| | | | |
|---|---|---|---|
| 11,198,402 B2 | 12/2021 | Guigner et al. | |
| 2004/0185339 A1* | 9/2004 | Jones .................... | H01M 50/24 429/177 |

(Continued)

FOREIGN PATENT DOCUMENTS

| | | |
|---|---|---|
| CN | 105702891 A | 6/2016 |
| CN | 206774590 U | 12/2017 |
| WO | 2016203260 A1 | 12/2016 |

OTHER PUBLICATIONS

OTM Solutions, "Thermal conductivity (K-value), thermal resistance (R-value), and thermal transmittance (U-value)", 2023, https://www.otm.sg/thermal-conductivity-k-value-thermal-resistance-r-value-and-thermal-transmittance-u-value (Year: 2023).*

(Continued)

*Primary Examiner* — Maria Laios
*Assistant Examiner* — Ziheng Lu
(74) *Attorney, Agent, or Firm* — FisherBroyles, LLP; Craig W. Mueller

(57) ABSTRACT

Exterior thermal battery-cover for a battery housing characterised in that the cover comprises at least a thermal insulating layer with a thermal resistance (R-value) of at least 0.070 m²·K/W, preferably with a thermal resistance of at least 0.078 m²·K/W and whereby the thermal insulating layer is at least one of a fibrous layer, an open cell foam layer or closed cell foam layer.

16 Claims, 2 Drawing Sheets

(52) U.S. Cl.
CPC ....... *H01M 10/625* (2015.04); *H01M 10/658* (2015.04); *H01M 50/249* (2021.01); *H01M 50/278* (2021.01); *H01M 50/282* (2021.01); *B60K 2001/0438* (2013.01); *H01M 2220/20* (2013.01)

(56) References Cited

U.S. PATENT DOCUMENTS

| | | | | |
|---|---|---|---|---|
| 2010/0316912 | A1* | 12/2010 | Hashimoto | H01G 11/52 |
| | | | | 429/247 |
| 2013/0108901 | A1* | 5/2013 | Schaefer | H01M 10/613 |
| | | | | 429/82 |
| 2015/0364730 | A1* | 12/2015 | Glaspie | B32B 7/12 |
| | | | | 429/176 |
| 2018/0212208 | A1* | 7/2018 | Kim | H01M 10/613 |
| 2019/0305303 | A1* | 10/2019 | Yebka | H01M 4/366 |
| 2020/0161600 | A1* | 5/2020 | Abe | H01M 50/126 |
| 2021/0074960 | A1* | 3/2021 | Stude | B32B 15/14 |

OTHER PUBLICATIONS

Search Opinion from parent EP19214274. Jul. 27, 2020. 3 pages.
European search report from parent EP19214274. Jul. 27, 2020. 2 pages.
International Search Report from PCT/EP2020/084438. 3 pages.
Written opinion from PCT/EP2020/084438. 4 pages.

* cited by examiner

EXTERIOR THERMAL BATTERY COVER

This application is a national stage application under 35 U.S.C. 371 and claims the benefit of PCT Application No. PCT/EP2020/084438, filed Dec. 3, 2020, which designated the United States, which PCT application claimed the benefit of European Patent Application No. EP19214274.3, filed Dec. 6, 2019, the disclosure of each of which are incorporated by reference herein.

TECHNICAL FIELD

The invention is related to an exterior thermal battery cover for a battery housing system as used in battery electric vehicles, in particularly for a battery housing system exteriorly located under the vehicle facing the road.

BACKGROUND ART

For electric driving rechargeable batteries are used. In general, these batteries include an electrode assembly including a positive electrode, a negative electrode and a separator interposed between the positive and the negative electrodes, a case receiving (or accommodating) the electrode assembly, and an electrode terminal electrically connected to the electrode assembly. An electrolyte solution is injected into the case in order to enable charging and discharging of the battery via an electrochemical reaction between the positive electrode, the negative electrode and the electrolyte solution. The shape of the case may vary depending on the purpose.

The battery cases also called cells, may be used in a battery module. In a battery module a plurality of unit battery cells are coupled to each other in series and or parallel so as to provide relatively high energy density for, as an example, driving electric with a hybrid vehicle. To obtain the relative high power rechargeable battery module for electric vehicles, the battery module is formed by interconnecting the electrode terminals of the plurality of unit battery cells to each other.

Battery modules can be constructed in a block design or in a modular design. In a block design each battery cell is coupled to one common current collector structure and battery management system and the batteries are arranged in a housing. In the modular design, a plurality of battery cells is connected in submodules, and several submodules are connected to each other to form the module. In a modular design, different battery management functions can be realised on a module or submodule level, which provides favourable aspects, such as improved interchangeability.

The modules are generally placed into and fixed to a suitable housing, in the form of a casing with a coverage, the casing is mountable to the underside of the vehicle, preferably against carrier beams of the main structure of the vehicle. The battery housing might be made from metal, SMC (Sheet Molding Compound) or thermoplastic composites.

The thermal management system is required to safely use the battery module by efficiently emitting, discharging and/or dissipating heat generated from the rechargeable batteries. If the heat emission, discharge, and or dissipation is not sufficiently performed, temperature deviations occur between respective battery cells, such that the battery module cannot generate a desired amount of power. In addition, an increase of the internal temperature can lead to abnormal reactions occurring therein and thus charging and discharging performance of the rechargeable cells deteriorates and the life-span of the rechargeable battery is shortened. Thus, cooling devices for effectively emitting, discharging, and or dissipating heat from the cells may be required. Cooling/heating devices may be integrated within the casing next to the battery modules, for instance in the form of a liquid cooling and heating system.

The range of a battery is depending of its temperature during usage, a temperature in the range of between 10 and 40° C. is optimal for the system. However, during periods outside the optimal temperature, the total electric range of the battery might be reduced, while also the lifetime of the battery might suffer from running outside the optimal temperature range. The total range of an electric vehicle is defined as the total distance the vehicle can drive starting with one full battery load.

Due to structural reasons, battery cells, battery modules, cooling plates, carrier plates and stiffening structures may be tightly connected to the battery housing. The tight connection of the structural panels etc. may effectively form thermal bridges, direct conduction paths for heat to the housing and to the outer side of the housing.

The battery housing may be arranged on the underbody of the vehicle as a component, and therefore the battery housing may be designed with an overall height in which the outer contour of the traction battery protrudes downwardly from the underbody of the body-floor assembly in the direction of the road surface and, therefore, may be exposed to aerodynamic drag underneath the car alongside the lower surface of the housing, together with the conduction paths formed by the connection to the battery housing a source of temperature loss is created interfering with the heat management system of the battery and ultimately increasing the energy consumption for this heat management.

Although solutions for providing heat treatment, like thermal insulation patches e.g. for instance in the form of a felt or foam layer, against the inner surface of the battery housing wall might reduce the temperature loss over the surface, it does not prevent the loss of the temperature over the structural connection necessary to keep the interior parts from moving during use and assembly.

It is the goal of the current invention to overcome these problems, to provide a better thermal management system and ultimately to enhance the range of the battery.

SUMMARY OF INVENTION

The object of the invention is achieved by an exterior thermal battery cover for a battery housing according to claim 1, and by a battery electric vehicle with at least one battery cell stored in a battery housing including at least one submodule having fixations connected to the battery housing and an exterior thermal battery cover according to the invention.

In particular, with an exterior thermal battery cover for a battery housing comprising at least a thermal insulating layer with a thermal resistance (R-value) of at least 0.070 m²·K/W, preferably with a thermal resistance of at least 0.078 m²·K/W and whereby the thermal insulating layer is at least one of a fibrous layer, an open cell foam layer or closed cell foam layer Surprisingly by introducing such an exterior thermal battery cover, it is possible to reduce the energy loss due to heat sink effects such that the battery range increases between 1 and 15% depending on the battery load, ambient temperature and speed of the car.

Preferably the cover comprises at least a thermal insulating layer of a porous fibrous material, wherein the porous fibrous material comprises staple fibers and/or filaments, and a binder. The porous fibrous layer is thermally formed into the cover forming a stiff panel with a density of between 150 and 600 kg/m3 between, a thermal conductivity between 0.03 and 0.06 W/mK and a thickness of between 2.0 and 10 mm, preferably with a thickness of between 2 and 6 mm.

Surprisingly, a thermal battery cover attached to the outside of the battery housing with preferably a fibrous felt material having a density of between 150 and 600 g/m3 and a thickness of between 2.0 and 10 mm is enough to reduce the energy loss due to the heat bridging effect of the housing and internal structure. It reduces the thermal convection mainly by reducing the aerodynamic drag along the surface of the battery housing including the structural heat sink areas. Hence reducing forced convection of the wind due to driving.

A further advantage of the cover is a protection against stone chipping of the lower surface of the battery housing. Surprisingly, a porous fibrous felt compressed to a density of between 150 and 600 kg/m3 is able to withstand the effect of stone chipping while still reducing the energy loss due to heat sink effects. For example, a 3 mm compressed felt battery cover according to the invention showed a range saving of between 2 and 15% depending on the battery load, the ambient temperature and the speed of the vehicle. Range is defined as the distance a car can drive on one full battery charge, range saving means that the car can increase the maximum range.

Surprisingly when a thick 20 mm less compressed felt battery cover was compared with a thin compressed material as claimed the increase of range was not as much as expected for high ambient temperatures. Hence already a thin compressed material is able to reduce the effect of the heat sink structure of the battery housing. However, a 20 mm less compressed felt material is not able to withstand stone chipping and will disintegrate rapidly when placed underneath a vehicle facing the road.

From a heat sink perspective also other thermal insulating materials might be used to obtain the reduction of the heat sink effect. However due to the location—on the exterior surface of the battery housing facing the road—most materials might not be able to withstand the harsh conditions. In particular stone chipping force might rip the part away. It could be shown that foam is less beneficial for this reasons.

When insulating materials are used that are less able to withstand stone chipping a protective layer might be used on the outer surface of the insulating layer facing the road. This protective layer might be formed by a plastic or plastic-fiber composite. For instance, glass fibers embedded in a thermoplastic matrix whereby the matrix is preferably based on polyolefin or polyester. The protective layer might be built such that it can function as a hard shell or carrier layer, whereby the insulating layer is placed on top, and either touch the surface of both the protecting layer and the outer surface of the battery housing, or include at least a partial air gap between the insulating layer and the outer surface of the battery housing.

Preferably the thermal insulating layer has an area weight between 700 and 2000 g/m2, preferably between 850 and 1600 g/m2.

The battery cover might comprise at least a thermal insulating layer of a porous fibrous material, wherein the porous fibrous layer comprises staple fibers and/or filaments, and a binder.

Preferably the staple fibers and/or filaments are at least one of organic material, such as cotton, kenaf, hennep, or thermoplastic material, such as polyester preferably polyethylene terephthalate (PET), or polyamide, preferably polyamide-6 or polyamide 6,6, or polyolefin, preferably polypropylene or polyethylene, or inert material, preferably glass fibers, carbon fibers, ceramic fibers, or Nomex fibers, or mixtures thereof.

Exterior thermal battery cover for a battery housing according to one of the preceding claims, whereby the fibers and/or filaments have a hollow or solid cross section.

Exterior thermal battery cover for a battery housing according to one of the preceding claims whereby the fibers and/or filaments have a fiber fineness of between 3 and 10 dtex, preferably between 3 and 8 dtex.

Preferable at least 10 to 40% by weight of binder is used.

Preferably the binder is either a thermoplastic binder, preferably polyester, polyamide or polypropylene, or a thermoset binder, preferably epoxy resin or phenolic resin. The binder can be in the form of a powder, resin or fibers. During thermal molding of the part, the binder melts and will bind the fibers together forming a consolidated part.

Preferably a binder fiber based on a bicomponent staple fiber or filament is used with polyester preferably polyethylene terephthalate (PET) in the core and a copolymer of PET in the sheath, whereby during the thermal molding step only the copolymer melts and forms the binder. Preferably the ration between core and sheath in the bicomponent filament or fibers will be between 60% core and 40% sheath and between 80% core and 20% sheath, preferably with a filament composition of 70% core and 30% sheath. Preferably water-repellent and or flame retarding additives are added to the sheath before melt spinning the filaments.

Preferably as water repellent a polysiloxane based or fluorobased additive is used in a final concentration of between 0.5 and 2% in the sheath polymer blend.

Preferably as a flame-retardant a phosphorous based additive is added to the sheath polymer blend with a concentration of between 3-5%.

All fibers and or filaments used might be based on virgin material or recycled and or reclaimed material. Preferably filaments or fibers are used based on polyester bottle flakes or flakes coming from other recycled sources.

As an example a staple fiber blend based on 60% polyester fibers and 40% bicomponent staple fibers. Preferably the amount of bicomponent fibers ranges between 30 and 70% of the total fibers used.

Alternatively, a glass fiber felt material bound with polypropylene binder might be used. Eventually other fibers are mixed into the fiber felt.

In a preferred solution the full part is made of bicomponent filaments, that are spun, laid down in a web, cross lapped and needled to form the blank material of which the part can be formed in a conversion process, based on thermal molding.

By adapting the density and or the amount of binder, the stiffness of the part as well as the protection against stone impact might be increased. Depending on the way the exterior battery cover is mounted, with or without an air gap the requirements might be slightly different.

Preferably the part is stiff such that it can hang underneath the battery box without substantially sagging.

The part may be compressed such that areas are more or less compressed showing a variable thickness distribution over the length of the part, the stiffer areas with lower thickness increasing the stiffness of the part and help prevent sagging, while the less stiff areas are increasing the thermal insulation of the part.

During driving the exterior thermal battery cover might be prone to wind washing effects, the effect of wind passing through the porous fibrous material causing forced convection. This may be diminished by at least locally increasing the density of the panel and or reducing the air flow resistance.

Preferably a wind barrier layer might be used to further decrease the wind washing effect. The wind barrier layer may be at least one of a micro perforated or airtight barrier layer for instance at least one of a foam, film or foil layer and or a membrane type material the same or similar to Goretex, for instance a PU or LDPE type microporous membrane.

As a film or foil material preferably a mono or dual layer is used, preferably made of polyester, polyamide, polyolefin, like polypropylene (PP) or polyethylene (PE), or thermoplastic polyurethane (TPU). Or for instance a dual or triple layer film or foil, like PE/PA combination. The advantage of dual or triple layer foils is that the material pairing during lamination and the need for a micro perforated or airtight layer might be divided over the different film layer. For instance, the middle stays intact while the outer soften and or melt to form the lamination/binding to the adjacent surface layer.

As a closed foam material preferably a closed cell polyester foam layer might be used as the wind barrier layer. This would have the advantage of further increasing the stiffness of the panel and thereby increasing the resistance to stone chipping.

In case a nonporous film or foil is used on the outside of the exterior thermal battery cover also a water tightness can be achieved preventing the exterior thermal battery cover from getting wet. A wet battery cover would decrease the thermal insulation so preventing the layer from getting wet and or staying wet helps increasing the overall thermal performance during driving in all types of weather conditions. Using a water barrier such that no water can arrive against the outer surface of the battery housing will in addition prevent any possible corrosion of this area, as the barrier not only prevents rainwater from entering, but also sand debris and salt carried with the rain water from the road.

Alternatively, two layers of thermal insulating material with a wind barrier in the middle might be used. The density of the outer layer might be higher than the density of the inner layer. Both layers can be from the same or a different material, for instance a fibrous layer for the outer layer facing the road and a foam layer for the inner layer facing the battery housing.

The part can be produced by molding the at least one insulating material for instance a felt material, that is eventually pre-consolidated by a first heating step and/or mechanically, or a slab foam layer, into the final shape. Additional layers might be added during the same molding step or attached before or after the molding step. If necessary the part may be cut to shape and any appliances like mountings, clipping etc. may be attached.

Instead of mounting appliances, the part might be glued against the outer surface of the battery housing and/or adjacent structures using water resistant glues as known in the art, preferably by a glue layer that is able to hold under harsh conditions.

Alternatively, mechanical mounting is used alone or in combination with a glue.

The invention is further comprising a battery electric vehicle with at least one battery cell stored in a battery housing having fixations connected to the battery housing, whereby an exterior thermal battery cover as disclosed is mounted underneath the battery housing facing the road.

Preferably the exterior thermal battery cover is mounted with an enclosed air layer between at least a part of the surface of the battery housing and the upper surface of the exterior thermal battery cover. An air gap works between the surface of the battery housing and the upper surface of the battery cover works as an additional thermal layer by creating a stationary standing air layer.

Preferably the thermal insulating layer and the enclosed air layer are combined to form a thermal insulating multi-layer with a combined thermal resistance (R-value) of at least 0.070 $m^2 \cdot K/W$, preferably with a combined thermal resistance of at least 0.078 $m^2 \cdot K/W$.

Although by increasing the density the thermal conductivity increases, at the same time the resistance to stone chipping and the effect of wind washing reduces, giving overall already a good thermal insulation visible in an increase in the range of the vehicle. But it also helps maintaining the battery lifespan.

The surface of the battery cover might be including ribs to create spacers assuring the enclosed air layer in dedicated areas. Preferably the enclosed air layer or enclosed air layers are coinciding with the structural connections inside the battery housing creating the thermal bridges. This has the advantage that the air in the enclosed air layer is further increasing the thermal insulation locally by forming an additional layer that thanks to the cover is not disturbed by any wind washing effects.

Preferably the battery cover is also covering the side of the battery housing and/or any adjacent structures. For instance, with the battery cover covering and touching the sides of the battery housing to form a partial encapsulation of the battery housing.

The exterior thermal battery cover may provide a sealing against the surface of the battery housing, eventually adjacent structures and/or the body in white to form a partial encapsulation of the battery housing. Alternatively, the battery cover further comprises means for sealing the battery cover against the battery housing and or adjacent structures and or the body in white.

The battery housing might be having an irregular designed surface. Hence the battery cover according to the invention might be moulded such that it follows the shape of the battery housing or the irregular shape might be used to introduce local enclosed air layers to further optimise the thermal resistance of the combined air layers and battery cover.

The thermal insulation properties may be measured as thermal conductivity according to ASTM C518-91 (ISO8301), when not indicated differently the measurement and/or the results are at 20° C.

Following are examples showing the possible implementation of the battery cover according to the invention. The examples and data might be adapted or combined with the teaching as given in this disclosure.

EXAMPLE 1

A felt material based on bicomponent filaments was moulded to form an exterior thermal battery cover according to the invention. The felt has an area weight of 850 g/m2 and is compressed to a thickness around 3 mm in the main areas of the part. The thermal resistance obtained is 0.079 m2K/W with a thermal conductivity for the material measured being 0.038 W/mK.

EXAMPLE 2

A felt material based on bicomponent filaments was moulded to form an exterior thermal battery cover according to the invention. The felt has an area weight of 1200 g/m2 and is compressed to a thickness around 6 mm in the main areas of the part. The thermal resistance obtained is 0.171 m2K/W with a thermal conductivity for the material measured being 0.035 W/mK.

EXAMPLE 3

In a case the dedicated space for the battery cover is 6 mm, one can decide to fill the space fully with a felt material for instance according to example 1 or example 2, or one can decide to combine the felt material with an enclosed air layer. If a 3 mm enclosed air layer would be added to the material of example 1 an additional thermal resistance of 0.115 m2K/W can be added to the already available thermal resistance of example 1, giving a total of 0.194 m2K/W.

Although by increasing the density the thermal conductivity increases, at the same time the resistance to stone chipping and the effect of wind washing reduces, surprisingly is still giving overall a good thermal insulation visible in an increase in the range of the vehicle. Furthermore, it helps maintaining the battery lifespan by keeping a more constant temperature while reducing the energy needed to do so.

EXAMPLE 4

An exterior thermal cover according to the invention was used on a car equipped with a battery housing placed underneath the passenger compartment parallel to the floor of that compartment. On the surface of the battery housing facing the road the exterior thermal cover was placed. The cover was made of polyethylene terephthalate bicomponent filaments comprising up to 100% recycled Polyethylene terephthalate. The filaments were spun into a mat and needled before thermal forming of the cover part. The thermal forming was done with a molding process. Preferably an area weight between 850 and 1600 gram/m2 was used, preferably 1000 gram/m2. The thus formed filament mat was thermally formed into a cover with less and more compressed areas, having a final density of between 150 kg/m3 and 800 kg/m3. When tested on the vehicle, it was found that not only had it significantly increase the thermal insulation of the battery, both during heating and cooling phases. Furthermore it was found that this monolayer structure due to its stiffness (tensile strength) was able to deform during impact of the cover with obstructions and able to return substantially back to its original intended shape. Hence the cover was not only improving the thermal conditioning of the battery pack but in addition was substantially preventing impact damage to the underside of the battery housing, thanks to the high elongation of the consolidated material used. In comparison to a state of the art fibre matrix structure made of glass fibers and polymer, the elongation factor was found to be approx. 10 times higher, which makes the kerb up and down of a shaped part easier. Therefore, the cover made of polyester filaments according to the invention deforms elastically and offers good protection against stone bombardment of the front tyres.

BRIEF DESCRIPTION OF DRAWINGS

FIG. 1 is showing a vehicle with a body structure (2) and wheels (1). Underneath the body structure a battery housing is mounted facing the road (5). The battery housing (3) might be made of a strong material able to withstand impact like for instance composite or metal, within the housing a frame structure (6) of sorts might be mounted to the internal wall of the battery housing to guarantee a good fixation of the battery cells and or modules within the battery housing. Side beams (4) might be placed alongside the walls of the battery housing and fixed preferably to the body structure to form a stiffened zone that can withstand impact on the car and in particular the battery box during a crash of the car, reducing the risks on the battery modules.

In the case of the state of the art, the battery modules inside the battery housing is cooled or heated to maintain the temperature within a certain range, however the frame structure (6) structurally connected to the battery housing is forming a temperature bridge to the other side of the battery housing wall. Hence heat (7) is able to radiate from the outside wall to the environment. This is independent from any thermal insulating material placed within the battery housing structure (not shown).

As the battery housing is directly exposed to the outside environment, in particularly during driving, a flow of air (8) is passing the lower area of the batter box cooling or heating the outside of the battery box even further, thereby reducing the thermal management efforts within the battery housing. In particular, increase the energy used for maintaining a constant temperature of the battery elements and or modules.

FIGS. 2 to 6 show different design situations how to combine the exterior battery cover as disclosed so far with a battery housing on a vehicle. All material or material combinations disclosed before and following can be freely combined according to the beneficial features they provide.

Figures 1, 2, 3:
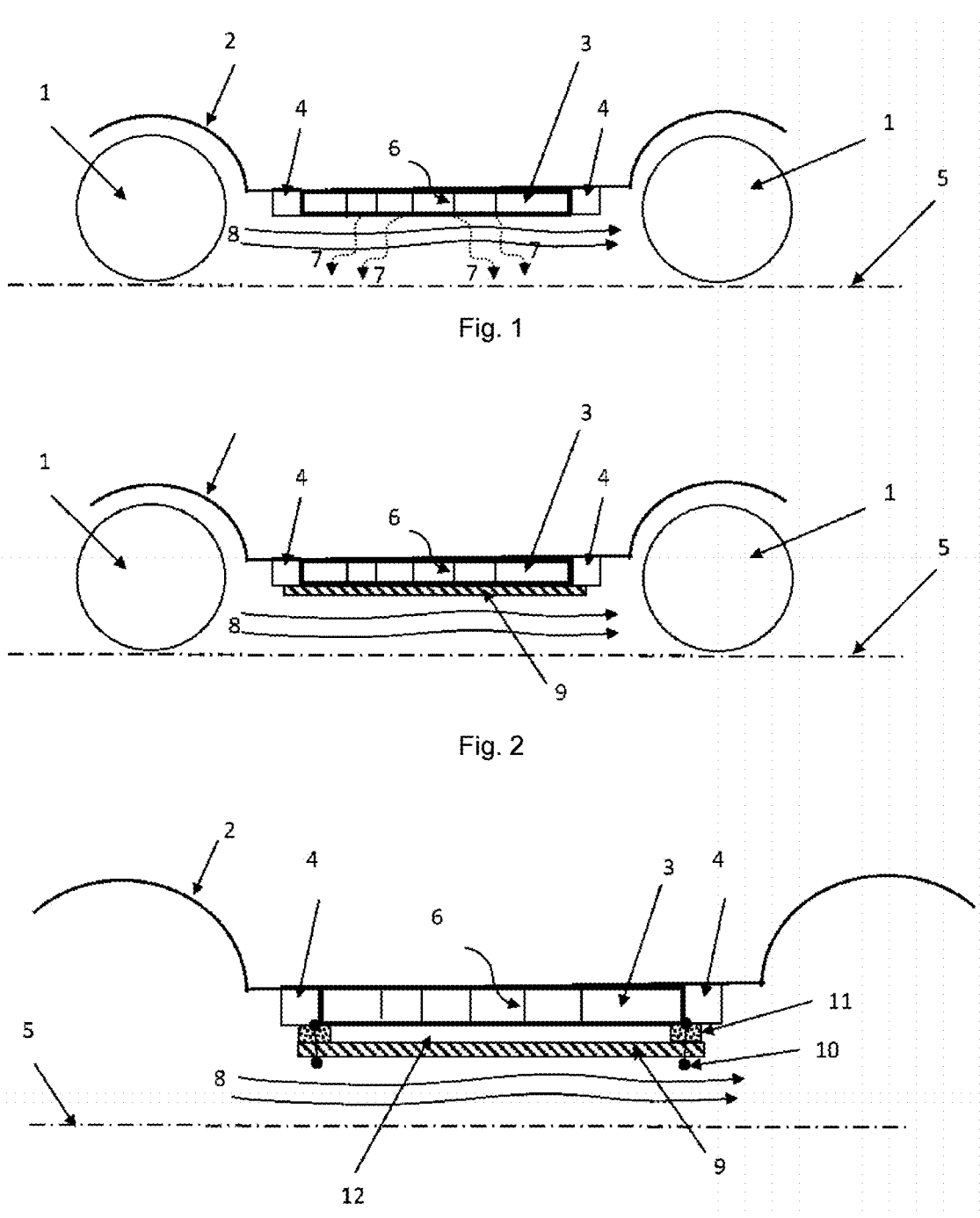
FIG. 1 is a schematic figure of the state of the art situation.
FIG. 2 is a schematic of a proposed solution.
FIG. 3 is a schematic of a proposed solution.

FIGS. 2 and 3 are showing the same constellation as shown in the state of the art, however the battery housing is covered with an exterior thermal battery cover (9) according to the invention. The battery cover can be made of a fibrous or foam material. Or can be made by a combination of a plastic shell and a thermal insulating inlay made of foam or felt between the shell and the outer surface of the battery housing.

In a first embodiment (FIG. 2) the exterior thermal battery cover is placed adjacent the battery housing. The exterior cover may be glued over the full surface or only around the rim, leaving a minimal enclosed air layer between the surfaces. Even a minimal enclosed air layer is already sufficient to decouple the surface of the battery housing thermalyl radiating and the exterior cover.

In a second embodiment (FIG. 3) the exterior cover is placed with a dedicated enclosed air layer (12). A dedicated enclosed air layer may be achieved by the means for mounting (10), including spacer parts into the mounting and or by the moulded shape design with for instance at least one recess to create such a dedicated enclosed air layer. To prevent a stream of air from entering via the enclosed air layer between the lower surface of the battery housing and the adjacent surface of the exterior cover, a sealing (11) at least around at least a part of the rim might be beneficial to close the enclosed air layer, preferably keeping the area enclosed as large as possible. The spacer function and the sealing might be integrated in the same material solution.

Figures 4, 5, 6:
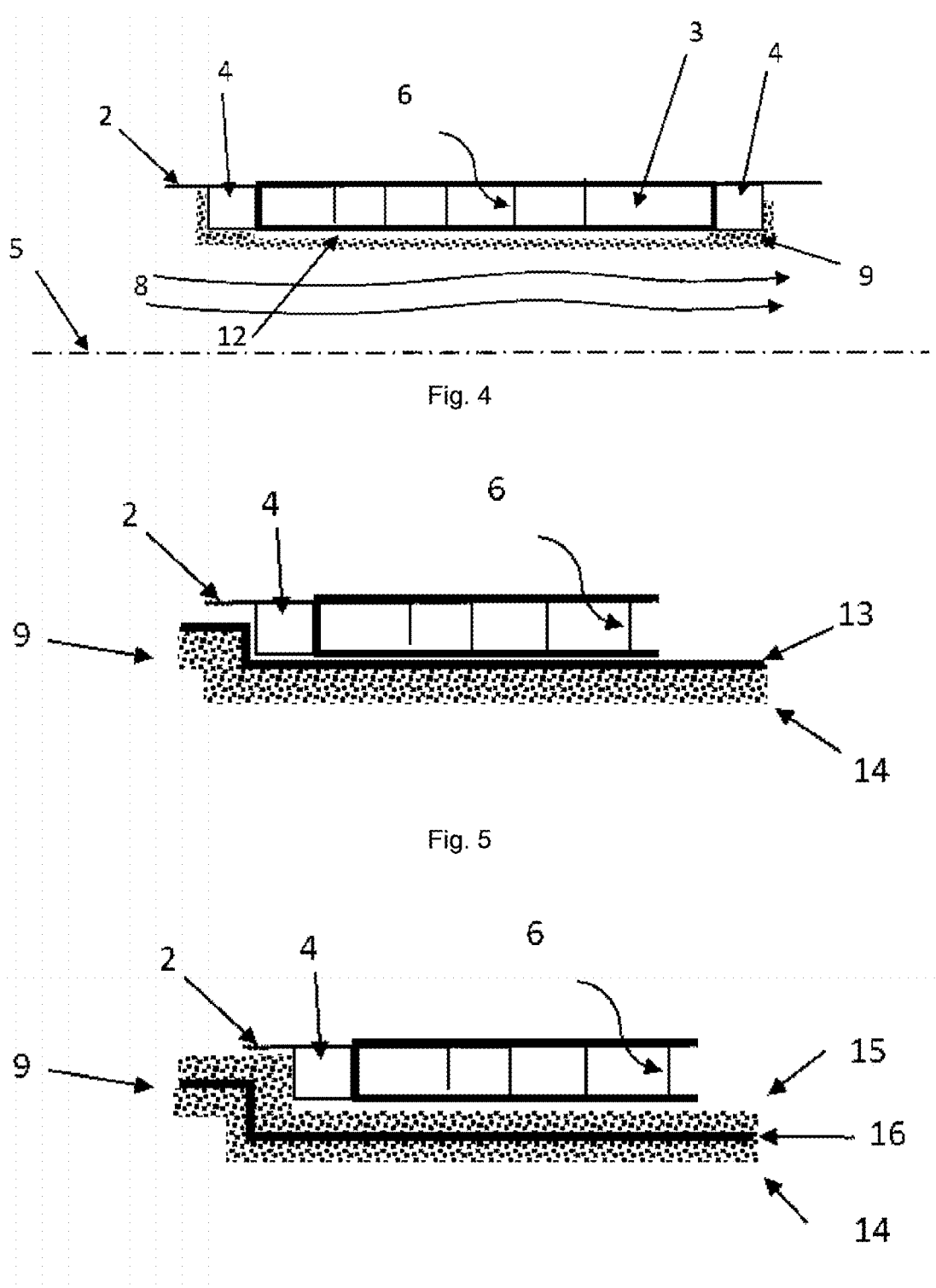
FIG. 4 is a schematic of a proposed solution.
FIG. 5 is a schematic of a proposed solution.
FIG. 6 is a schematic of a proposed solution.

Alternatively, the exterior cover (9) may be extended to include surrounding structures alongside the battery housing like for instance the stiffening beams (FIG. 4). Preferably the exterior cover is made of a porous fibrous material according to the invention, compressed to withstand the impact of stones known as stone chipping. The material can be thermally moulded to form a fitting shape to cover the battery housing structure and possible adjacent structures.

The design of the cover can also help to smooth out battery housing structures like beams, to obtain a more aerodynamic surface underneath the cover or an optimised drag performance. Optionally a dedicated enclosed air layer (12) in the form of a recess or recesses might be integrated in the moulded shape. Although it is not necessary for the thermal function a high bending stiffness is preferential for keeping the part in its shape during use as well as increasing the durability against stone chipping. Surprisingly, the high density fibrous material gives still a very good performance keeping the battery temperature more constant. It could be shown that by using such a panel structure either with or without enclosed air layer was able to reduce the amount of energy by An extension of the exterior battery cover along and over a corner of the part to cover also the side of the battery housing and/or the adjacent structures to further encapsulate the lower areas and prevent winds from blowing pass possible heat sinking structures might further reduce the heat sink effects.

In FIGS. 5 and 6 the different material solutions are depicted against the same battery housing situation as depicted in FIG. 1-3.

The engine cover shield (9) comprises at least one thermal insulating layer (14) of a porous fibrous material. It might further comprise a second layer that is able to stop wind and/or water (13). This layer can be either one of a film, foil, impervious foam layer or microporous membrane layer. The film or foil layer might be a monolayer film or a bilayer film. Although it has to be watertight or wind tight, it might still be a breathable film or foil able to let condense water formed in the area between battery housing and cover escape. The membrane can have a similar behaviour and can be one that is the same or similar to the membranes sold under the trademark of Goretex. By preventing wind from pressing into the porous fibrous material the steady air in the undercover material and eventually in the enclosed air layer is not disturbed. This further increases the thermal insulation under in particularly driving condition at higher speeds. This wind proof and or water proof layer can be placed either facing the battery housing or facing the road. Optionally a film can be placed on both sides of the porous fibrous layer. Eventually the porous fibrous layer may be enwrapped and sealed within such a layer, forming a wind and or water proof pouch.

In a further preferred solution a wind and or water proof layer (16) is placed between 2 fibrous layer to form a sandwich construction. The first fibrous layer (14) might be the same or different from the second fibrous layer (15). The fibrous layer might be different in fiber composition, mixture and or fineness and or the amount of binder used. For example, the outer fibrous layer (14) might have a higher binder content than the inner fibrous layer to get a better stone chipping performance and a difference in thermal conductivity between the layer close to and/or adjacent the battery housing and the one facing the road. In addition, further treatment of the inner fibrous layer (15) and the outer fibrous layer (14) might be different, for instance it might be beneficial to treat only one side with a flammability and or a water-repellent treatment. For instance, both layers are from the same or similar basic fibrous material, but the outer layer obtains the water repellent treatment and the inner layer the flame retarding treatment.

This can be also beneficial for the environment as the outer fibrous layer might be more in contact with rainwater and might leach its treatment into the rainwater. While the inner fibrous layer is mostly protected by the wind and/or water proofing layer and the treatment might not be exposed to high levels of water.

The invention claimed is:

1. An exterior thermal battery cover for a battery housing, comprising:

a thermal insulating layer with a thermal resistance (R-value) of at least 0.070 $m^2 \cdot K/W$, wherein the thermal insulating layer is a porous fibrous layer made of a porous fibrous material comprising staple fibers and/or filaments and a binder; and wherein the porous fibrous layer is moulded to form a panel with a density of between 150 and 600 kg/m3, a thermal conductivity between 0.03 and 0.06 W/mK and a thickness of between 2.5 and 10 mm.

2. The exterior thermal battery cover for a battery housing according to claim 1, wherein fibers and/or filaments of a porous fibrous material of the porous fibrous layer are based on at least one of organic origin material, polyamide, or inert material, or fiber and/or filament mixtures thereof.

3. The exterior thermal battery cover for a battery housing according to claim 2, whereby the porous fibrous layer is treated with a flame retardant agent and/or a flame retardant additive mixed into at least one of the materials forming the fibers and/or filaments.

4. The exterior thermal battery cover for a battery housing according to claim 1, whereby fibers and/or filaments of a porous fibrous material of the porous fibrous layer have a fiber fineness of between 3 and 10 dtex.

5. The exterior thermal battery cover for a battery housing according to claim 1, whereby fibers and/or filaments of a porous fibrous material of the porous fibrous layer have a hollow or solid cross section.

6. The exterior thermal battery cover for a battery housing according to claim 1, wherein the binder of a porous fibrous material of the porous fibrous layer is either a thermoplastic binder or a thermoset binder.

7. The exterior thermal battery cover for a battery housing according to claim 1, further comprising at least one of a micro perforated or airtight wind barrier layer.

8. The exterior thermal battery cover for a battery housing according to claim 7, whereby the wind barrier layer is at least one of a foam, film or foil layer, and/or a membrane.

9. The exterior thermal battery cover for a battery housing according to claim 1, whereby the porous fibrous layer is treated with a water repellence agent and/or a water repellent additive mixed into at least one of the materials forming the fibers and/or filaments.

10. The exterior thermal battery cover according to claim 1, further comprising a protecting layer formed by a plastic or plastic-fiber composite.

11. The exterior thermal battery cover for a battery housing according to claim 1, further comprising means to mount the exterior thermal battery cover underneath the battery housing on a side facing a road.

12. A battery-powered electric vehicle with at least one battery cell stored in a battery housing, characterized in that an exterior thermal battery cover according to claim 1 is mounted at least underneath the battery housing facing a road.

13. The battery-powered electric vehicle, according to claim 12, wherein the thermal insulating layer includes an enclosed air layer between the battery housing and the thermal insulating layer, and whereby the thermal insulating layer and the enclosed air layer are combined to form a thermal insulating multi-layer with a combined thermal resistance (R-value) of at least 0.070 m$^2$·K/W.

14. A battery-powered electric vehicle according to claim 12, whereby the exterior thermal battery cover is mounted with an enclosed air layer between a surface of the battery housing and an upper surface of the exterior thermal battery cover.

15. The battery-powered electric vehicle according to claim 12, whereby the battery cover at least partially covers a side of the battery housing and/or adjacent structures.

16. The battery-powered electric vehicle according to claim 12, whereby a sealing is used between the battery cover and at least partially a side of the battery housing and/or adjacent structure.

\* \* \* \* \*